Figure 1:
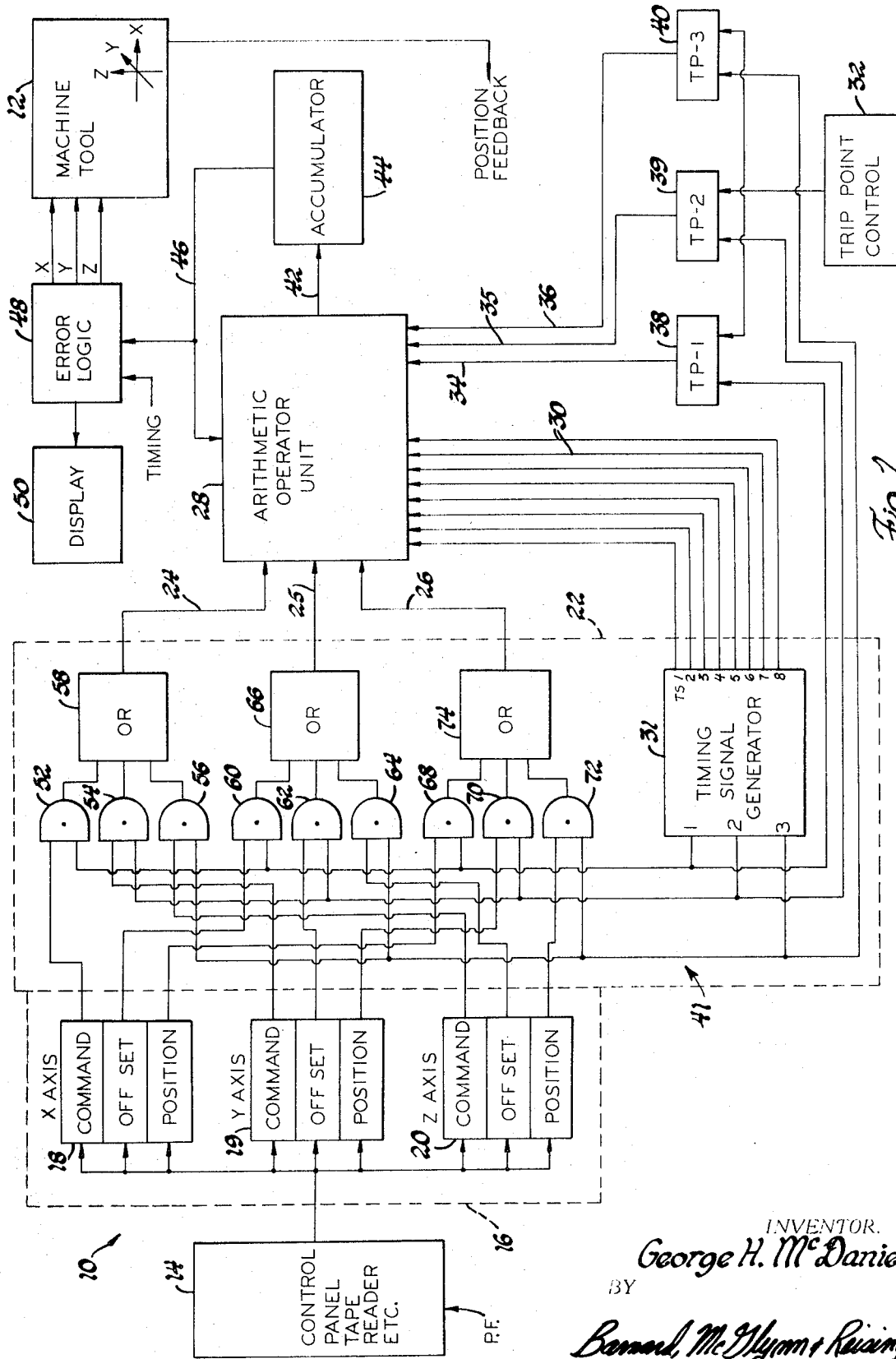

United States Patent
McDaniel

[15] 3,666,930
[45] May 30, 1972

[54] TIME SHARED POSITIONING SYSTEM FOR NUMERICAL CONTROL
[72] Inventor: George H. McDaniel, Northville, Mich.
[73] Assignee: The Bendix Corporation
[22] Filed: Aug. 5, 1970
[21] Appl. No.: 62,230

[52] U.S. Cl............................235/151.11, 307/243, 328/154
[51] Int. Cl. .......................................................G05b 19/22
[58] Field of Search...............235/151.11; 307/243; 328/154

[56] References Cited

UNITED STATES PATENTS

| | | |
|---|---|---|
| 3,390,315 | 6/1968 | McDonough et al. ........235/151.11 X |
| 3,519,905 | 7/1970 | Little et al......................235/151.11 X |
| 3,551,656 | 12/1970 | Wohlfiel .........................235/151.11 |
| 3,105,197 | 9/1963 | Aiken...................................328/154 |
| 3,330,969 | 7/1967 | Loyen...................................307/243 |

Primary Examiner—Malcolm A. Morrison
Assistant Examiner—R. Stephen Dildine, Jr.
Attorney—William F. Thornton, McGlynn, Reising, Milton & Ethington and Plante, Hartz, Smith and Thompson

[57] ABSTRACT

A numerical control system of the point-to-point type for a three-axis machine wherein a single arithmetic unit accommodates the arithmetic operations for all three axes in a time division multiplexed fashion.

8 Claims, 2 Drawing Figures

TIME SHARED POSITIONING SYSTEM FOR NUMERICAL CONTROL

This invention relates to numerical control systems for machine tools and particularly to a numerical control system which employs a single arithmetic operator in a time division multiplexed fashion to perform a serial sequence of operation on command signals for each of several controlled machine axes.

Numerical control systems of the point-to-point type generally employ a plurality of arithmetic units for generating the control signal quantities which are applied to the mechanisms associated with each of the command controlled axis. As is well known, a typical numerical control device may have several controlled axes and, thus, have several such mechanisms. Using conventional practice there would, thus, be an arithmetic unit for each of the controlled axes.

In a specific example of prior art, the arithmetic unit performs the function of comparing the commanded position to the current position of a tool slide, taking any offsets which may be commanded into account, and transferring the resulting output to an accumulator. The output is generally called an error signal. The accumulator compares the error signal to each of several "trip point" signals to vary the tool displacement speed as the error becomes increasingly smaller. The trip points are generally fixed distances from the commanded position at which tool speed decreases are accomplished until at the final trip point, motor power is cut off and the tool is allowed to coast toward the commanded position.

Having established the background of the art to which the invention relates, the present invention has for its principal object the reduction of system components through the use of a single arithmetic unit to perform the command signal preparation function for each of several controlled axes in a numerical control system. The object of the invention is accomplished by the use of a multiplex mode of operation in which command signal quantities for the several axes are applied to a single arithmetic unit in a time division multiplexed fashion which calls for the performance of a routine on each of several input signals which are applied in fixed order and at spaced intervals.

According to a more specific feature of the invention, timing signals are provided for gating the axis command signals into an arithmetic unit at spaced intervals for the performance of a fixed sequence of operations on each command signals, the spaced intervals being chosen to be of a time length which is greater than the time required to perform the fixed sequence of operation. Among the serially performed sequence of operations are the steps of comparing the error signal to each of several trip points so that the tool slide servo mechanism may be controlled accordingly.

Figure 2:
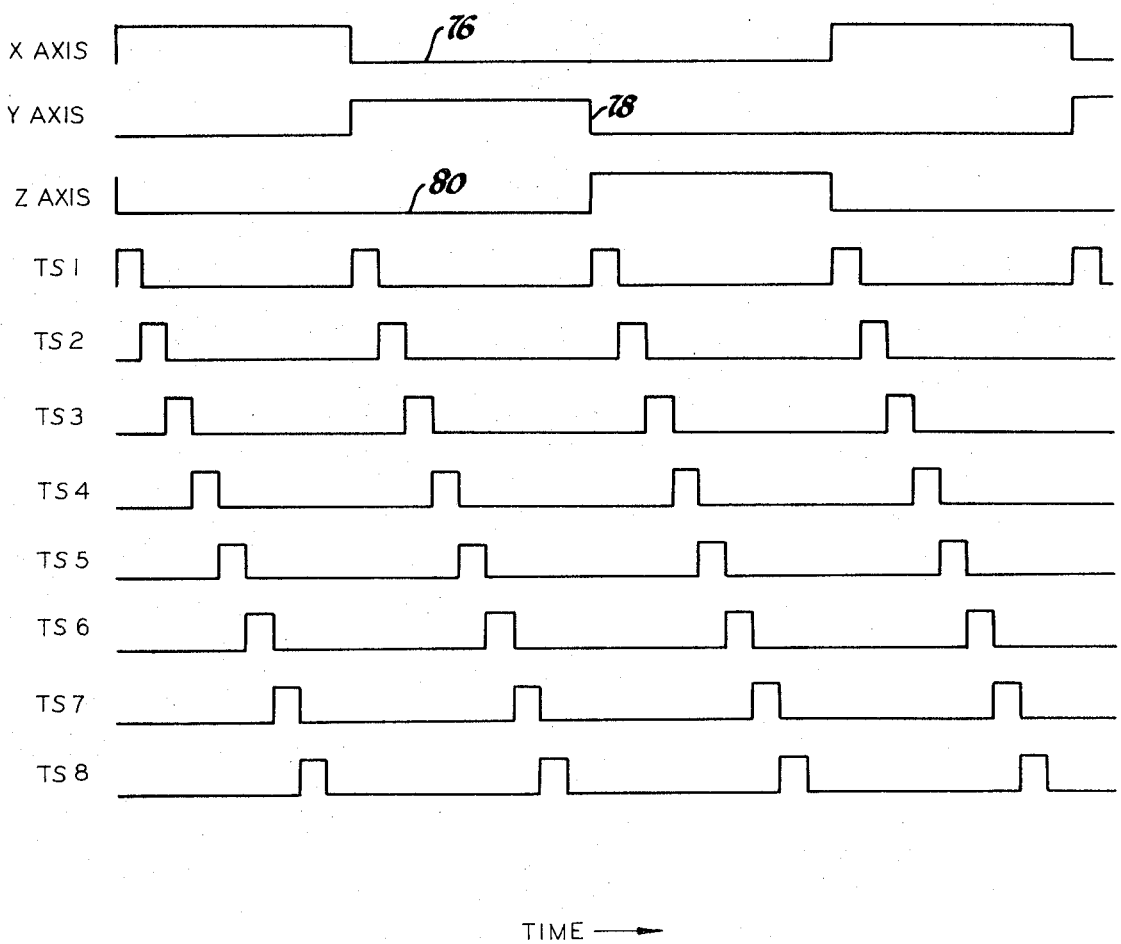

The various features and advantages of the invention will become more apparent from the following specification which sets forth in detail a specific embodiment of the invention. This specification is to be taken with the accompanying drawings in which:

FIG. 1 is a block diagram of a numerical control system employing the invention; and FIG. 2 is a waveform diagram showing the relationship between the signal quantities employed in the circuit of FIG. 1.

Referring now to FIG. 1 the invention is embodied in a numerical control system 10 for the point-to-point control of each axis of a machine tool 12 having three mutually perpendicular axes of tool displacement and mechanisms such as motors and jack screws for controlling the displacement of the tool along each of the three axes. The selection of the number three is not especially significant and more or fewer axes may also be multiplexed in the manner described herein. The desired axial movement are input to the system 10 by an operator control panel 14 having suitable X, Y, and Z numerical input means of a type commonly known and used in the numerical control art. The commands which are input or "dialed in" by way of control panel 14 are directed to storage unit 16 having X, Y, and Z register banks 18, 19, and 20, respectively. Position commands may also come from a tape reader as will be apparent to those skilled in the art. Each of the register banks has three separate portions, the first portion for storing the input command, the second portion for storing a tool offset, if any, and the third portion for storing the current position of the tool, this information being received from the tool 12 by means of a position feedback channel. The digital information from the register banks 18, 19, and 20 is fed to a multiplexer unit 22 having command, offset, and position outputs 24, 25 and 26 connected to a single arithmetic unit 28. The function of the arithmetic unit 28 is to provide a multiplexed error signal output on line 42 which is proportional to the axis command plus the individual axis offset minus the current position of the tool slide for each controlled axis. This function, along with the additional function of comparing the error signal to each of a plurality of trip points, is carried out as a serial sequence of operations under the control of timing signals which are received on input lines 30 from a timing signal generator 31 in the multiplexer unit 22.

Three trip points are established at decreasing distances from the commanded position by way of a trip point control unit 32 having signal output lines 34, 35, and 36 connected to arithmetic unit 28. The output lines are connected through coincidence gates 38, 39, and 40 associated with trip points 1, 2, and 3, respectively to gate in the trip points sequentially upon the occurence of timing signals from the generator 31 on line 41.

The output line 42 of the arithmetic unit 28 is connected to the accumulator 44 which acts as a buffer storage for the axis error signal. The accumulator 44 is connected by way of output line 46 back to the arithmetic unit such that the contents of the accumulator may be compared with the trip points applied to the arithmetic unit by way of lines 34, 35, and 36. Accumulator 44 is also connected to error signal logic unit 48 which distributes the X, Y, and Z axis commands to the individual mechanisms of the tool 12 and also to a position display unit 50. Unit 48 is synchronized with the timing signals to distribute the error signals to the proper axes.

Describing the multiplexer unit 22 in greater detail a first series of AND gates 52, 54, and 56 is connected to receive the timing signals labeled 1, 2, and 3 from the timing signal generator 31 and also to receive the command signal quantities from the registers 18, 19, and 20. The output of the AND gates 52, 54, and 56 are commonly connected to an OR gate 58 the output of which is represented by command output line 24.

A second series of AND gates 60, 62, and 64 is connected to receive the timing signals from generator 31 and also to receive the X, Y, and Z offset signal quantities from registers 18, 19, and 20. The output of AND gates 60, 62, and 64 are commonly connected to an OR gate 66 the output of which is the offset command line 25.

A third series of AND gates 68, 70, and 72 is connected to receive the timing signals from generator 31 and also to receive the current position signal quantities from register portions 18, 19, and 20, respectively. The outputs of the AND gates 68, 70, and 72 are connected commonly to an OR gate 74 the output of which is a position command signal on line 26. Each of the command, offset, and position signal quantities is connected to the arithmetic unit 28 for the calculation of the error signal on line 42 in accordance with a serial sequence of operations to be described.

OPERATION

The operation of the numerical control system 10 of FIG. 1 will now be described with reference to the waveform diagram of FIG. 2. The top three lines of FIG. 2 are phase-staggered, square waveforms 76, 78, and 80 which are generated by the timing signal generator 31 for appearance on lines 41. As previously described, these three phase-staggered waveforms are applied to the AND gates 52, 54, 56, 60, 62, 64, 68, 70, and 72 for time division multiplexed transfer of the command, offset, and position signals from the three control axes registers 18, 19, and 20. In addition, these signals are applied to the trip point gates 38, 39, and 40 for the transfer of trip point information to the arithmetic operator 28. Accordingly, during the time waveform 76 is in the high-voltage condition, gates 52, 60, and 68 are conductive to transfer the X axis signal quantities to the arithmetic operator. During the time waveform 78 is in the high-voltage condition, gates 54, 62, and 70 are conductive to transfer the Y axis signal quantities to the arithmetic operator. Finally, during the time waveform 80 is in the high-voltage condition, gates 56, 64, and 72 are conductive to transfer the Z axis signal quantities to the arithmetic operator.

FIG. 2 shows eight additional time-staggered waveforms labeled TS1 through TS8 these waveforms appearing on line 30 as indicated in FIG. 1. The pulse of TS2 follows the pulse of TS1 in time and the pulse of TS3 follows the pulse of TS2 in time until all eight pulses, TS1 through TS8, occur during the high-voltage condition of waveform 76. The second series of pulses TS1 through TS8 occur during the interval waveform 78 is in the high-voltage condition. The third series of pulses TS1 through TS8 occur during the time waveform 80 is in the high-voltage condition and the cycle repeats. The waveforms of FIG. 2 may be easily generated by means of a stable oscillator and suitable delay mechanisms as will be apparent to those of ordinary skill in the electronics art.

The serial sequence of operation which occurs in the arithmetic operator 22 upon occurence of the timing pulses TS1 through TS8 are as follows: TS1 causes the loading of previously measured position data into a position signal storage area; TS2 causes the algebraic addition of the command and the offset information and the storage of the sum in the accumulator 44; TS3 causes the sum to be complemented if necessary and the storage of the result in the accumulator 44; TS4 causes the current position to be subtracted from the contents of the accumulator and the difference stored in the accumulator 44; TS5 causes the difference signal quantity to be complemented if necessary. At this time the accumulator contains the error signal. Upon the occurence of TS6 the accumulator contents are compared with the first trip point from trip point gate 38. If the accumulator-to-trip point comparison indicates that the mechanism has caused displacement of the tool slide to the trip point position the motor which directs the slide motion is slowed down. This may be accomplished in a variety of ways including current switching. At TS7 the accumulator contents are compared with the second trip point and the motor speed is again decreased if the comparison shows the trip point has been reached. At TS8 the contents of the accumulator 44 are compared with the third trip point and if the trip point has been reached, power to the motor is shut off and the tool is permitted to coast to the command position. This sequence of events is repeated serially and continuously for the X, Y, and Z signal quantities to continuously control the position of the machine tool using only a single arithmetic unit and in such a seriallized fashion as to permit simplicity of operation and system fabrication.

It is to be understood that the embodiment of the invention described herein is illustrative in character and is not to be construed in a limiting sense.

The embodiments of the invention in which an exclusive property or privilege is claimed are defined as follows:

1. In a numerical control system for a mechine tool having a plurality of position-controlled mechanisms for respective control axes; means for providing respective signals for commanding the position of each mechanism; an arithmetic unit for performing a serial sequence of operations on signals received thereby; and multiplexer means for sequentially gating the respective command signals to the arithmetic unit at spaced intervals to begin said serial sequence for each command signal at a different time, said multiplexer means including means for generating a first sequence of signals defining successive and relatively long input intervals, a plurality of gate means grouped according to respective control axes and connected between said means for providing and said arithmetic unit, said first sequence being applied to said gate means to input said command signals during successive input intervals, each interval corresponding to a different control axis, and means for generating a repeating second sequence of signals defining relatively short operating intervals of such duration as to permit the second sequence to occur in its entirety within each successive input interval, said second sequence being applied to the arithmetic unit to cause arithmetic operation thereof on said command signals during said input intervals.

2. Apparatus as defined in claim 1 wherein the means for providing includes for each axis a command signal storage means, an offset signal storage means and a current position storage means.

3. Apparatus as defined in claim 2 wherein the arithmetic unit produces an output signal related to the command signal plus the offset signal minus the position signal.

4. Apparatus as defined in claim 3 wherein the sequence of operations includes comparing the output signal to at least one trip point for each axis to vary the character of mechanism control when the trip point is reached.

5. Apparatus as defined in claim 4 wherein the multiplexer means comprises a plurality of coincidence gates and generator means for producing time-staggered signals to sequentially open the gates.

6. A method of operating a numerical control system having a plurality of controlled axes and devices associated with such axes for responding to respective position command signals comprising the steps of: applying the command signals sequentially and at fixed intervals to an arithmetic operator for performing a serial sequence of arithmetic operations; performing the sequence of operations repeatedly for each command signal within said fixed intervals; and, as part of said sequence of operations, comparing signals derived by the arithmetic operator from the command signals to each of at least two trip points to determine the manner of controlling said devices.

7. The method defined in claim 6 wherein the step of applying includes the steps of presenting the command signals to a plurality of gates, generating phase-staggered timing signals defining the intervals, and applying the timing signals to the gates.

8. A numerical control system for a machine tool having a plurality of position-controlled mechanisms for positioning the tool along respective axes comprising: means for providing position data signals for each of the mechanisms; an arithmetic unit for producing position error signals for each of said mechanisms; and multiplexer means for applying said position data signals to the arithmetic unit in a time divided sequence according to the position-controlled axes.

* * * * *